US008850089B1

(12) United States Patent
Wang et al.

(10) Patent No.: US 8,850,089 B1
(45) Date of Patent: Sep. 30, 2014

(54) METHOD AND APPARATUS FOR UNIFIED FINAL BUFFER WITH POINTER-BASED AND PAGE-BASED SCHEME FOR TRAFFIC OPTIMIZATION

(75) Inventors: Chi-Lie Wang, Milpitas, CA (US); Jason Z. Mo, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 787 days.

(21) Appl. No.: 12/818,767

(22) Filed: Jun. 18, 2010

(51) Int. Cl.
*G06F 3/00* (2006.01)
*G06F 5/00* (2006.01)

(52) U.S. Cl.
USPC .......................................................... 710/52

(58) Field of Classification Search
USPC .......................................................... 710/52
See application file for complete search history.

(56) References Cited

U.S. PATENT DOCUMENTS

| | | | | |
|---|---|---|---|---|
| 6,356,553 B1* | 3/2002 | Nagami et al. | ................ | 370/397 |
| 6,570,884 B1* | 5/2003 | Connery et al. | ............... | 370/419 |
| 6,604,147 B1* | 8/2003 | Woo | ............................... | 709/240 |
| 7,372,813 B1* | 5/2008 | Cimino et al. | ................ | 370/235 |
| 7,814,223 B2* | 10/2010 | Arita et al. | ..................... | 709/235 |
| 7,978,802 B1* | 7/2011 | Raha et al. | ..................... | 375/371 |
| 8,090,895 B2* | 1/2012 | Takagi | .......................... | 710/317 |
| 2006/0050733 A1* | 3/2006 | Chappell et al. | .............. | 370/468 |
| 2008/0151909 A1* | 6/2008 | Scott et al. | .................... | 370/400 |
| 2010/0020802 A1* | 1/2010 | Willis | ........................ | 370/395.1 |
| 2010/0198936 A1* | 8/2010 | Burchard et al. | ............. | 709/212 |
| 2011/0283038 A1* | 11/2011 | Takagi | .......................... | 710/317 |

\* cited by examiner

*Primary Examiner* — Chun-Kuan Lee

(74) *Attorney, Agent, or Firm* — Heimlich Law, PC; Alan Heimlich, Esq.

(57) ABSTRACT

A method and apparatus for unified final buffer with pointer-based and page-based scheme for traffic optimization have been disclosed.

6 Claims, 12 Drawing Sheets

METHOD AND APPARATUS FOR UNIFIED FINAL BUFFER WITH POINTER-BASED AND PAGE-BASED SCHEME FOR TRAFFIC OPTIMIZATION

RELATED APPLICATION

This application is related to application Ser. No. 12/818,805 filed this same date titled "Method and Apparatus to Optimize Class of Service Under Multiple VCs with Mixed Reliable Transfer and Continuous Transfer Modes", which is hereby incorporated herein by reference in its entirety including all incorporated references therein. This application is related to application Ser. No. 12/818,822 filed this same date titled "Method and Apparatus to Optimize System Throughput with Retransmission Avoidance through Transmitter-Controlled Flow Control", which is hereby incorporated herein by reference in its entirety including all incorporated references therein.

FIELD OF THE INVENTION

The present invention pertains to switches. More particularly, the present invention relates to a method and apparatus for unified final buffer with pointer-based (also denoted pointer based) and page-based (also denoted page based) scheme for traffic optimization.

BACKGROUND OF THE INVENTION

Switches are widely used in systems. For example, the Serial Rapid Input Output (sRIO) Gen2 Switch may be used to meet wireless infrastructure customer's requirements for WCDMA/LTE Base Stations.

Quality Of Service (QOS) is an important issue in insuring that data that needs to arrive does so that the transmission does not suffer (e.g. video breaking up, voice dropping out, etc.) Switches are used to handle the data and quality of service is important across switch fabric. Certain traffic type may require reliable transfer without any packet loss through packet retransmission with low latency. Other traffic types can afford to be lossy but require maximum throughput and minimum latency. Under multiple Virtual Channels (VCs) with mixed Reliable Transfer/Continuous Transfer (RT/CT) modes, it may be difficult to handle packet retransmission for a VC in RT mode and silently discard the packets for a VC in CT mode. As a result, network traffic cannot be optimized especially when many packets are outstanding with large packet sizes. This presents a problem.

BRIEF DESCRIPTION OF THE DRAWINGS

The invention is illustrated by way of example and not limitation in the figures of the accompanying drawings in which.

DETAILED DESCRIPTION

Figure 1:
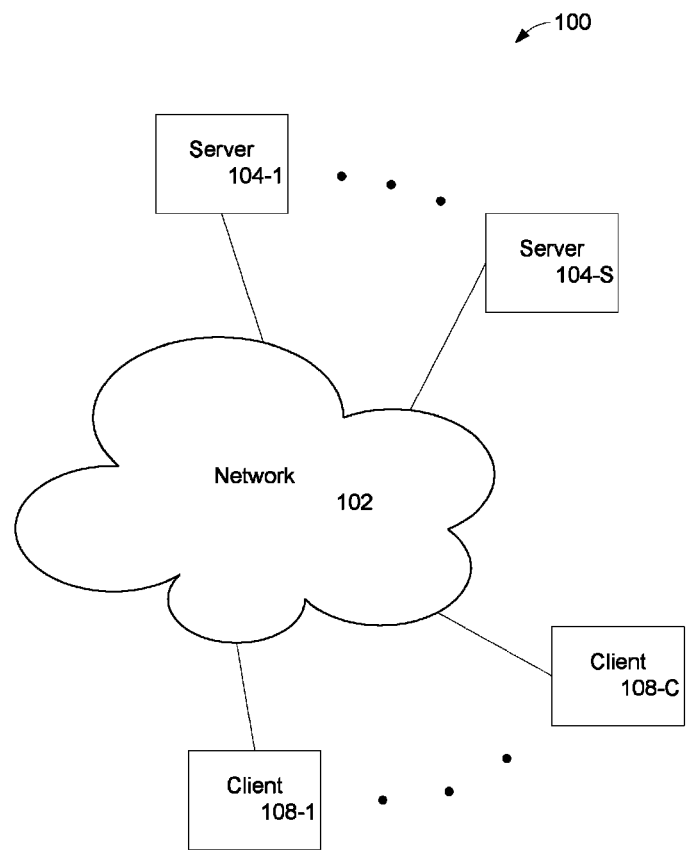
FIG. 1 illustrates a network environment in which the method and apparatus of the invention may be implemented.

For illustration purposes, the techniques of the present invention will be illustrated using an 18-port Serial Rapid IO (sRIO) Gen2 Switch. The techniques may be applied to other switches and other scenarios. In one embodiment of the invention, an 18-port Serial Rapid IO (sRIO) Gen2 Switch is to be implemented to achieve very high performance (up to 360 Gbit) with minimum latency (<30 ns excluding sRIO protocol stack delay) to meet wireless infrastructure customer's requirements for WCDMA/LTE Base Stations. In order to achieve the target performance under any traffic conditions with the lowest product cost, a method has been developed which will allow Egress Final Buffer to be configured with page based and pointer based scheme with multiple VCs. Page based scheme is for VC0 packets with dynamic buffer management, which could prevent prior arrived lower priority packets to block later arrived higher priority packets. Pointer based scheme is for VC1/VC5 packets with its packet buffer being configured as FIFO (First In First Out memory). Since VC1/VC5 doesn't support different priority levels, packet could be handled as first-in first-out basis. This scheme would allow VC1/VC5 traffic with smaller packet sizes to sustain the required throughput with much less memory buffers under the same ACK (ACKnowledgement) latency as VC0 packets. In order to provide more flexibility, the number of pages to be allocated for each VC can be programmable, which could further optimized system throughput based on different traffic pattern for the target applications.

In one embodiment of the invention, a page based memory buffer can be used to store VC0 packets with different priority as after the packets being stored into the memory, they can be transmitted/retransmitted out of the order as they were received.

In one embodiment of the invention, a page based memory buffer will prevent head of line blocking as later arrived higher priority packets can be transmitted/retransmitted prior to earlier arrived lower priority packets.

In one embodiment of the invention, each of the page based memory buffer can be configured to accommodate a maximum size sRIO packet with Free Buffer List to store all the available memory page pointers.

In one embodiment of the invention, while a VC0 packet is being received into the Final Buffer, Free memory page pointer from the top entry of the Free Buffer List will be retrieved. It will then be loaded into the respective Virtual Output Queue (VOQ) according to packet's priority level. This memory page pointer will be used to generate memory write address to store the packet in the Final Buffer.

In one embodiment of the invention, when the packet is being transmitted out of the Final Buffer, the specific VOQ will be selected based on the packet's priority level. The stored memory page pointer will be retrieved to generate a memory read address to read out the packet from the Final Buffer.

In one embodiment of the invention, the Packet Index for the transmitted packet will select the specific entry within a Packet Retransmission Mapper, which will be used to store the Memory Page Pointer, VOQ Index, and VOQ Read Pointer while the packet is being transmitted out.

In one embodiment of the invention, after the packet is being transmitted out successfully, ACK will be returned from Link Partner with packet index. The used memory page pointer being selected through returned packet index will be retrieved from Packet Retransmission Mapper. It will be released back to Free Buffer List for future use.

In one embodiment of the invention, if NACK (Negative ACKnowledgment) is returned from Link Partner along with packet index, packet retransmission will be initiated. The returned packet index will be used to retrieve the entire outstanding packet's VOQ Index and VOQ Read Pointer from Packet Retransmission Mapper. After all the VOQ Read Pointer being re-aligned; packet retransmission will start to retransmit all the outstanding packets.

In one embodiment of the invention, a pointer based memory buffer can be used to store VC1/VC5 packets without priority assignment. It can be used as a FIFO as the packets being transmitted or retransmitted will follow the same order as they were being received.

In one embodiment of the invention, a pointer based scheme will be able to accommodate more small size packets as multiple pages can be used to construct a pointer based FIFO for VC1 and VC5 packet data transfers. The number of pages to be allocated for each VC1 and VC5 are programmable based on their traffic pattern and packet size.

In one embodiment of the invention, if VC1/VC5 is used for control plane traffic with smaller packet size such as command issuing and status reporting, much less memory pages will be required therefore memory buffer can be used more efficiently to reduce product cost.

In one embodiment of the invention, each Pointer FIFO for VC1 & VC5 can be constructed through the allocated pages with a set of Start Address and Stop Address.

In one embodiment of the invention, while a VC1/C5 packet is being received into the Final Buffer, the FIFO pointer for packet SOP (Start Of Packet) will be loaded into the respective VOQ for VC1/VC5. This pointer will be incremented by 1 each time a packet data is being written into Final Buffer.

In one embodiment of the invention, when the packet is being transmitted out of the Final Buffer, the specific VOQ will be selected. The stored FIFO pointer will be retrieved to generate memory read address to read out the packet from the Final Buffer.

In one embodiment of the invention, the Packet Index for the transmitted packet will select the specific entry within Packet Retransmission Mapper, which will be used to store VOQ Index and VOQ Read Pointer while the packet is being transmitted out.

In one embodiment of the invention, the same Packet Index will also be used to select the specific entry within Dword Count Mapper, which will be used to store dword count of the transmitted packet.

In one embodiment of the invention, after the packet is being transmitted out successfully, ACK will be returned from Link Partner with packet index. The stored dword count being selected through returned packet index will be retrieved from Dword Count Mapper. It will be decremented from Dword Counter for future use.

In one embodiment of the invention, for RT mode packets, if NACK is returned from Link Partner along with packet index, packet retransmission will be initiated. The returned packet index will be used to retrieve the entire outstanding packet's VOQ Index and VOQ Read Pointer from Packet Retransmission Mapper. After all the VOQ Read Pointer being re-aligned; packet retransmission will start to retransmit all the outstanding packets.

In one embodiment of the invention, for CT mode packets, NACK returned will not cause packet retransmission. As a result, the stored dword count will be retrieved from Dword Count Mapper being selected through the returned packet index. It will be returned to Dword Counter for future use. VOQ Read Pointer will not be re-aligned as packet retransmission is not necessary.

In one embodiment of the invention, each time a VC0 packet is being stored into Final Buffer, the packet counter for the specific priority will be incremented by 1 which will decrement the available buffer space. After the stored packet is being transmitted with ACK returned, its packet counter will be decremented by 1 which will be used to increment the available buffer space. Buffer availability will be deasserted for a specific priority if there is no buffer space available to accommodate the packet with this priority level.

In one embodiment of the invention, each time a VC1/VC5 packet is being stored into Final Buffer, its dword counter will be incremented with the stored dwords which will decrement the available buffer space. After the stored packet is being transmitted, its dword count will be stored into Dword Count Mapper. Either ACK returned for RT/CT mode or NACK returned for CT mode will cause the stored dword count to be retrieved and the corresponding dword counter to be decremented. Buffer availability will be deasserted if the amount of dword space remaining cannot accommodate a maximum size packet to be received.

Switch Data Path

Figure 3:
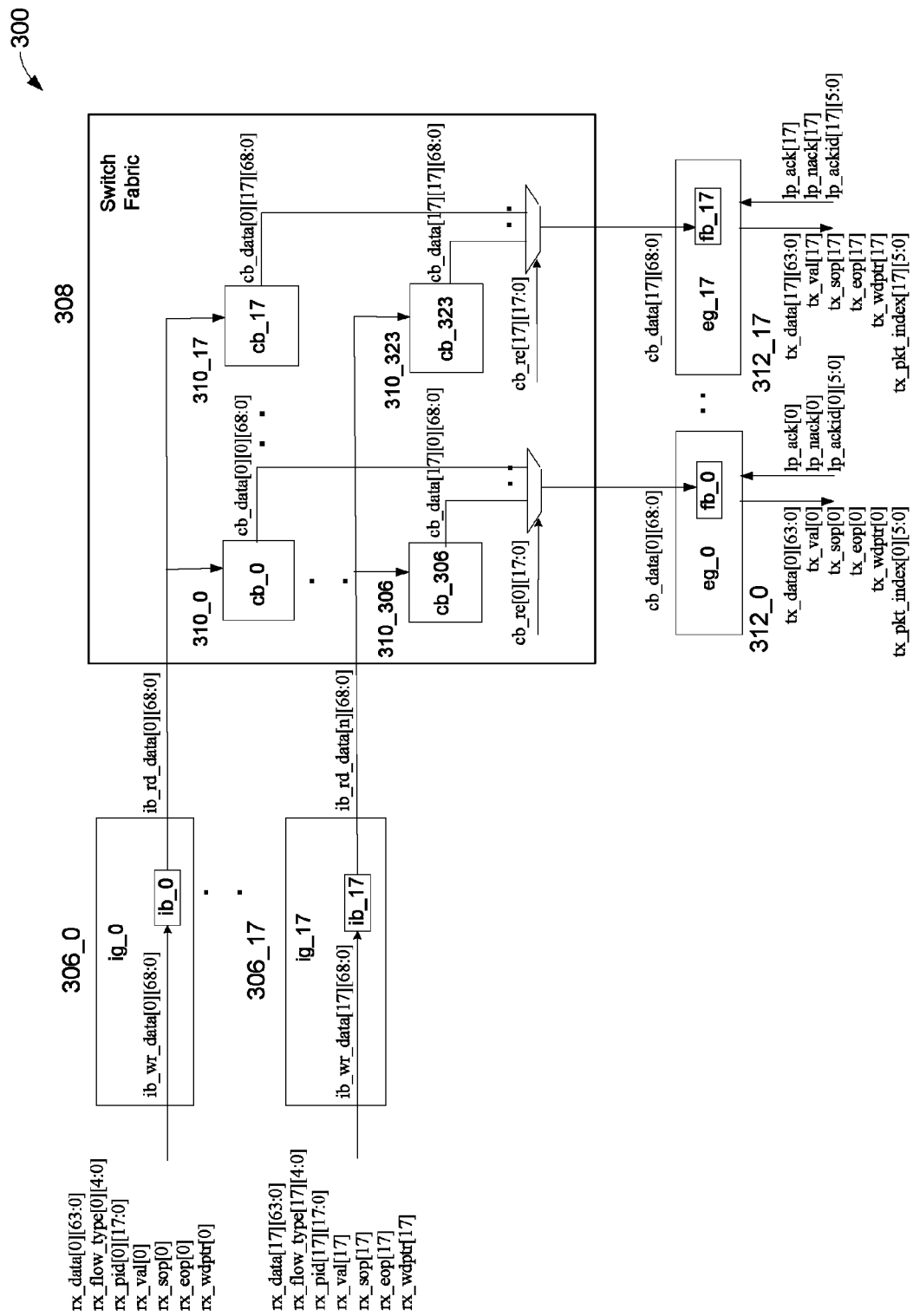
FIG. 3 illustrates one embodiment of the invention showing a switch data path.

FIG. 3 illustrates, generally at 300, one embodiment of the invention showing a switch data path for an 18-port Buffered Crossbar Switch, it consists of 18 Ingress Ports and each has an Input Buffer (IB) for packet reception. The received packet being stored into Input Buffer will be forwarded to one or multiple (for multicast support) of the 18 Crosspoint Buffers (CB) within a given row that corresponding to 18 Egress Ports. Total of 324 (18×18) CBs will be constructed within Switch Fabric. There are 18 Egress Ports and each has a Final Buffer (FB) that receives the forwarded packet from one of the 18 CBs within a given column that corresponding to 18 Input Ports.

In FIG. 3, at 306_0 through 306_17 are ingress ports (ig_0 through ig_17) each receiving a variety of inputs such as receive data (rx_data[p][63:0]), receive flow type (rx_flow_type[p][4:0]), receive destination port ID (rx_pid[p][17:0]), receive valid cycle (rx_val[p]), receive start of packet (rx_sop[p]), receive end of packet (rx_eop[p]), receive word pointer (rx_wdptr[p]), where p denotes the ingress port number (0 through 17). These inputs are for illustration and are not germane to understanding the invention beyond the concept that there is data received with a priority and it is switched. Each ingress port has an ingress buffer denoted ib_0 through ib_17 and receives an input denoted ib_wr_data[p][68:0], where again p refers to the port number. ib_wr_data[p][68:0] consists of the receive data, rx_data[p][63:0], and for example bit 64 being rx_sop[p], bit 65 being rx_eop[p], bit 66 being rx_wdptr[p], and bits 67 and 68 being reserved. Each an ingress buffer denoted ib_0 through ib_17 can be read and will output buffered data denoted ib_rd_data[p][68:0], where again p refers to the port number. ib_rd_data[p][68:0] consists of the receive data, rx_data[p][63:0], and for example bit 64 being rx_sop[p], bit 65 being rx_eop[p], bit 66 being rx_wdptr[p], and bits 67 and 68 being reserved.

In FIG. 3, at 308 is a switch fabric, having 310_0 through 310_323 crosspoint buffers denoted cb_0 through cb_323.

In FIG. 3, at 312_0 through 312_17 are egress ports (eg_0 through eg_17) each receiving a variety of inputs from the switch fabric 308 (cb_data[q][68:0], where q denotes the egress port number (0 through 17). Each egress port has an egress buffer denoted fb_0 through fb_17. Each egress port has outputs, for example, transmit data (tx_data[q][63:0]), transmit valid cycle (tx_val[q]), transmit start of packet (tx_sop[q]), transmit end of packet (tx_eop[q]), transmit word pointer (tx_wdptr[q]), and transmit packet index) tx_pkt_index[q][5:0], where q denotes the egress port number (0 through 17). Each egress port also has inputs received from a link partner, for example link partner ack (lp_ack[q]), link partner nack (lp_nack[q]), and link partner ack ID (lp_ackid [q][5:0]) where again q denotes the egress port number (0 through 17).

Unified Final Buffer Access Control

In one embodiment of the invention there is a Unified Final Buffer Access Control.

In one embodiment of the invention a Unified Final Buffer Access Control Block consists of the following functions blocks:

Final Buffer Virtual Output Queue (fb_voq)
Final Buffer Write Address Generation (fb_wr_addr)
Final Buffer Free Buffer List (fb_free_list)
Final Buffer Memory (fb_mem)
Final Buffer Read Address Generation (fb_rd_addr)
Retransmission Mapper (rexmit_mapper)
Dword Count Mapper (dw_cnt_mapper)

In one embodiment of the invention, each time a VC0 packet is being transferred into FB memory, the memory's page pointer being used to store the packet will be fetched from FB Free Buffer List to be stored into the specific FB VOQ entry based on its priority level. FB write address will be generated to select the location in FB memory for storing the packet. The packet counter will be increased by 1 to reduce buffer free space. For a VC1/VC5 packet being transferred into FB memory, VC1/VC5 packet buffer will be used instead. Since these packet buffers are being configured as FIFO, a set of start_addr and stop_addr for each VC will be used to select the FB memory for storing VC1/VC5 packets. After stop_addr is reached, wrap-around to start_addr will allow the packets to be received continuously as long as the FIFO is not full. The first FB write address to be used for storing packet's SOP will also be stored into the specific VOQ for VC1/VC5. The number of dwords for this packet will be used to increment Dword Counter (decrease available buffer space).

In one embodiment of the invention, while the stored packet is ready to be read out, its memory pointer/address will be retrieved from the respective VOQ accordingly to the selected VC/priority level. FB Read Address being generated will be used to read out the stored packet from FB memory. While the packet is being read out, Retransmission Mapper being selected through transmitted packet index will be used to store Transfer Mode (xfer_mode); Memory Page Pointer (page_ptr) for VC0 packets; VOQ Index (voq_index) for VC type and priority level; VOQ Read Pointer (voq_rd_ptr) for the VOQ entry that stored packet's memory pointer/address. In addition, Dword Count Mapper will be used to store VC1/VC5 packet's dword count. Upon receiving ACK/NACK from Link Partner along with packet index, the stored information will be retrieved being selected through the returned packet index. VOQ Index will be retrieved and VOQ Read Pointer will be realigned if packet retransmission is necessary. Otherwise, memory page pointer will be released to Free Buffer List for VC0 packets and Dword Count will be released to decrement Dword Counter for VC1/VC5 packets, which will allow the used buffer space to be freed up for future use as packet retransmission is not necessary.

Figure 4:
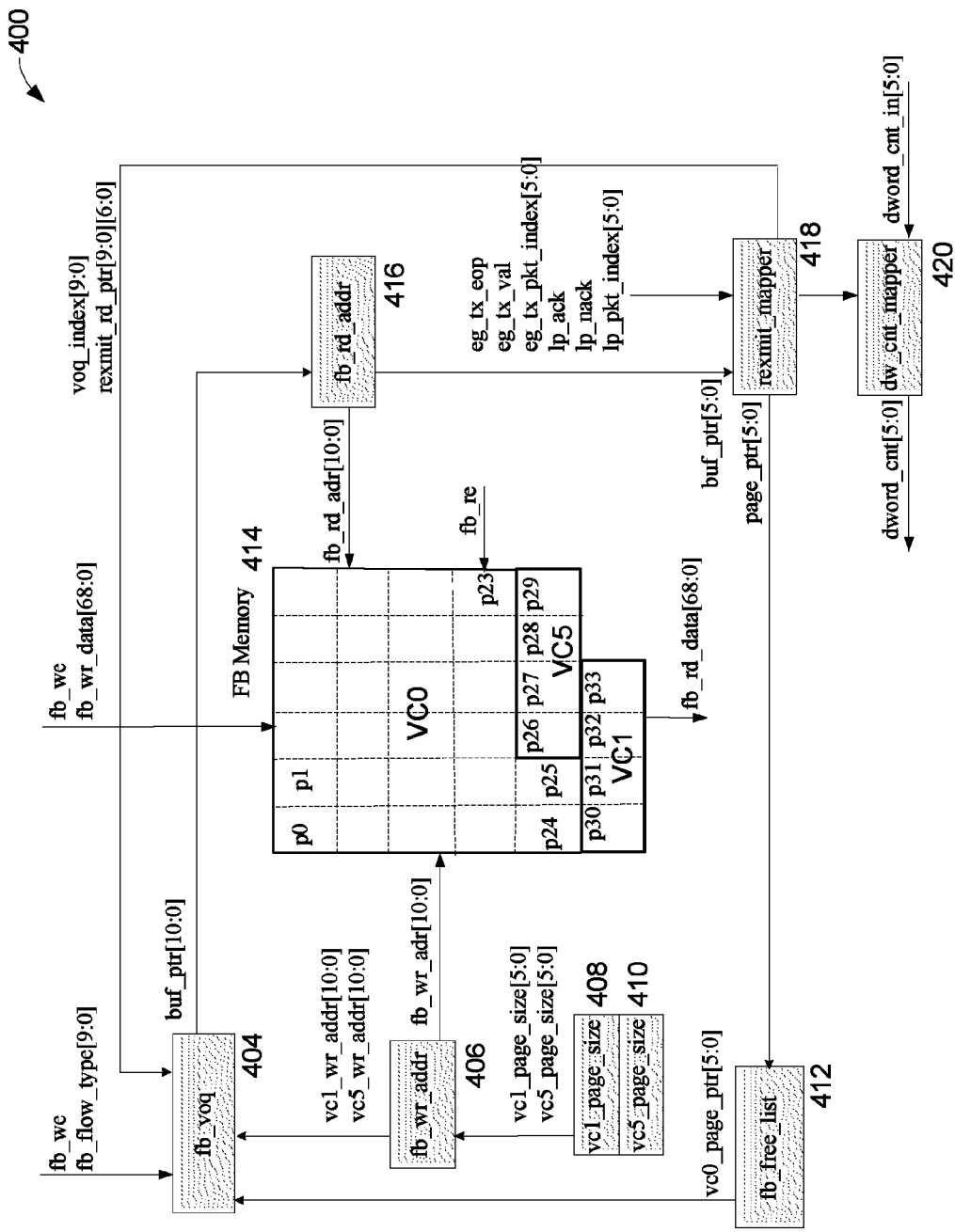
FIG. 4 illustrates one embodiment of the invention showing a Unified Final Buffer Access Control Block.

FIG. 4 illustrates, generally at 400, one embodiment of the invention showing a Unified Final Buffer Access Control Block.

At 404 is Final Buffer Virtual Output Queue (fb_voq). At 406 is Final Buffer Write Address Generation (fb_wr_addr). At 408 is VC1 page size (vc1_page_size) register. At 410 is VC5 page size (vc5_page_size) register. At 412 is Final Buffer Free Buffer List (fb_free_list). At 414 is Final Buffer Memory (fb_mem). At 416 is Final Buffer Read Address Generation (fb_rd_addr). At 418 is Retransmission Mapper (rexmit_mapper). At 420 is Dword Count Mapper (dw_cnt_mapper).

In one embodiment of the invention, for example, as illustrated in FIG. 4, fb_we & fb_flow_type[9:0] can be used to select which VOQ that VC0 packet's page pointer (vc0_page_ptr[5:0] or VC1/VC5 packet's write address (vc1_wr_addr[10:0]/vc5_wr_addr[10:0]) shall be stored.

In one embodiment of the invention, for example, as illustrated in FIG. 4, fb_wr_addr[10:0] is selected either through vc0_page_ptr[5:0] or through vc1_wr_addr[10:0]/ vc5_wr_addr[10:0].

In one embodiment of the invention, for example, as illustrated in FIG. 4, a set of start_addr and stop_addr for VC1 and VC5 is generated through the maximum number of pages vs. the number of pages allocated to VC1 (vc1_page_size[5:0]) or VC5 (vc5_page_size[5:0]).

In one embodiment of the invention, for example, as illustrated in FIG. 4, fb_free_list can be used to store all the free page pointers for VC0. While a packet is being written into Final Buffer, the top entry of VC0 Page Pointer (vc0_page_ptr[5:0]) will be retrieved and stored into the selected VOQ. This information will be used to generate write address for packet write to Final Buffer. In addition, it will also be used to generate read address while the packet is being read out of Final Buffer.

In one embodiment of the invention, for example, as illustrated in FIG. 4, FB Memory consists of 34 pages. The number of pages to be allocated for VC1 & VC5 are based on VC1 Page Size (vc1_page_size[5:0]) and VC5 Page Size (vc5_page_size[5:0]) register setting. The remaining pages will be allocated to VC0.

In one embodiment of the invention, for example, as illustrated in FIG. 4, While the packet is being read out of FB Memory, the top entry will be retrieved from the specific VOQ. Its read address (fb_rd_adr[10:0] will be generated to read out the packet from FB Memory.

In one embodiment of the invention, for example, as illustrated in FIG. 4, While the packet is being transmitted out, packet transfer mode (xfer_mode), VOQ Index (voq_index [9:0]), VOQ Read Pointer (voq_rd_ptr[6:0]) and VC0 packet's page pointer (buf_ptr[5:0]) will be stored into rexmit_mapper. VC1/VC5 packet's dword count (dword_cnt_in[5: 0]) will also be stored into dw_cnt_mapper at the end of the packet (eg_tx_val & eg_tx_eop) being selected through transmitted packet index (eg_tx_pkt_index[5:0]).

In one embodiment of the invention, for example, as illustrated in FIG. 4, While ACK (lp_ack) is returned from Link Partner, the stored page pointer (page_ptr[5:0]) for VC0 packet will be retrieved from rexmit_mapper being selected through the returned packet index (Ip_pkt_index[5:0]) and released to Free Buffer List.

In one embodiment of the invention, for example, as illustrated in FIG. 4, If NACK (Ip_nack) is returned instead, in RT mode, the VOQ Index (voq_index[9:0] and VOQ Read Pointer (voq_rd_ptr[6:0]) will be retrieved from rexmit_mapper for all the outstanding packets being selected through returned packet index (Ip_pkt_index[5:0]) and the corresponding VOQ's read pointer will be re-aligned for packet retransmission. In CT mode, packet retransmission will not be necessary (therefore VOQ Read Pointer will not be re-aligned). Instead, dword count (dword_cnt[5:0] will be retrieved and released for future use.

Final Buffer Memory (fb_mem)

In one embodiment of the invention there is a Final Buffer Memory (fb_mem).

In one embodiment of the invention the Final Buffer Memory has the following features:
  Total of 34 memory pages. More pages can be added if necessary
  Each page can accommodate up to a maximum size sRIO packet (35 dwords/276 bytes)
  The number of pages for VC1 and VC5 is configurable through vc1_page_size & vc5_page_size register (4 pages per VC1/VC5 on drawings as an example)
  Remaining 26 pages will be allocated for VC0
  When VC1 & VC5 are disabled, their pages can be reallocated to VC0
  VC1 & VC5 are pointer based structure (FIFO) to accommodate more small packets as priority passing is not needed
  VC0 is page based structure to support dynamic buffer allocation with priority passing through VOQ to store VC0 packet's pointer for each priority.
  Up to 26 memory pages being allocated to VC0 for full bandwidth support on small packets with long ACK delay In one embodiment of the invention, for VC0 packets, Final Buffer Memory Blocks will be implemented as shared resources to store the packet being transferred from Crosspoint Buffer. For VC1/VC5 packets, its Memory Blocks will be constructed as FIFO to store the packets being transferred from Crosspoint Buffer. The number of pages for VC1 and VC5 is configurable through vc1_page_size & vc5_page_size register and the remaining pages will be allocated to VC0 (if VC1/.VC5 is not enabled, its memory pages will be allocated to VC0 for a maximum of 34 memory pages). After reset, all the memory blocks being allocated to VC0 are free with their pointers being stored in Free Buffer Pointer List. When a VC0 packet is being transferred from Crosspoint Buffer to Final Buffer, a free memory page will be assigned to store the packet with its Memory Page Pointer being stored into the corresponding VC's VOQ entry. This pointer will be used to retrieve the stored packet when Final Buffer to Output Port data transfer is initiated. Each Memory Page consists of 35 64-bit dwords which can be used to store a maximum size of sRIO packet with its header. After the packet is being transferred out of the selected Final Buffer with ACK returned from its Link Partner to indicate the packet being transmitted successfully, the Memory Page will be freed up with its page pointer being moved back to Free Buffer List. For VC1 & VC5, their packet buffer will be constructed through the pages being programmable in the page size register with Start Address and Stop Address assigned. For a packet being transferred into the Final Buffer, its first address for Start of Packet (SOP) will be stored into the specific VOQ entry to indicate where the packet starts, which can be used to retrieve the packet while it is ready to be transmitted out of the packet buffer. Since each VC1 or VC5's packet buffer is constructed as FIFO and bounded by its corresponding Start and Stop addresses, after Stop Address is reached, it will rollback to Start Address for storing the subsequent packet.

Figure 5:
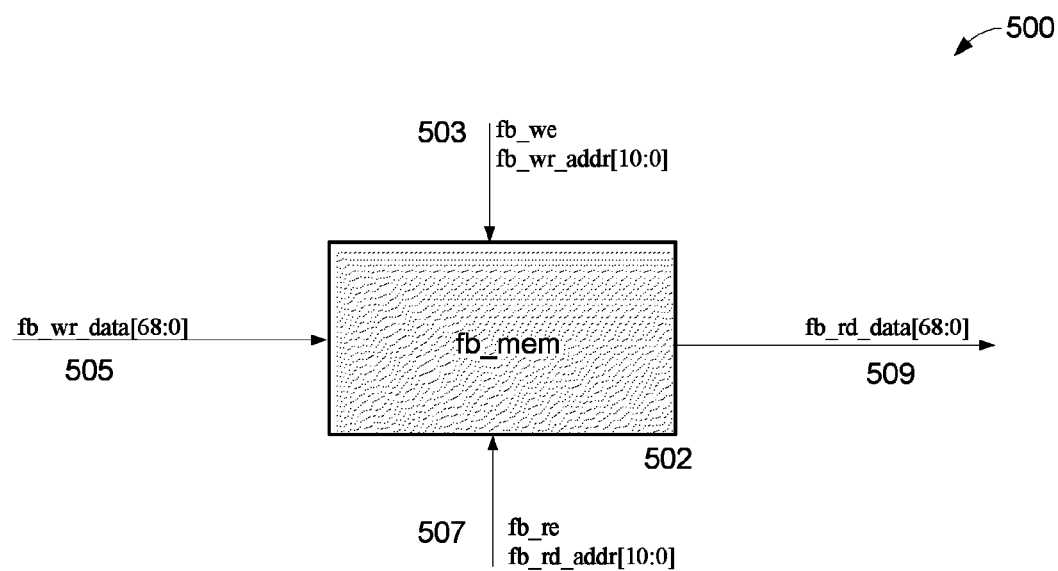
FIG. 5 illustrates one embodiment of the invention showing a Final Buffer Memory.

FIG. 5 illustrates, generally at 500, one embodiment of the invention showing a a Final Buffer Memory (fb_mem) at 502. At 503 are write enable (fb_we) and write address (fb_wr_addr[10:0]). At 505 is write data (fb_wr_data[68:0]). At 507 are read enable (fb_re) and read address (fb_rd_addr[10:0]). At 508 is read data (fb_rd_data[68:0]).

VC1/VC5 Programmable Page Size Registers

In one embodiment of the invention there are programmable page size registers.

In one embodiment of the invention VC1 Page Size register can be programmed through software to configure the number of pages to be allocated for VC1 packets. VC5 Page Size register can be programmed through software to configure the number of pages to be allocated for VC5 packets. If VC1 & VC5 are enabled, the remaining pages left will be allocated to VC0.

Figure 6:
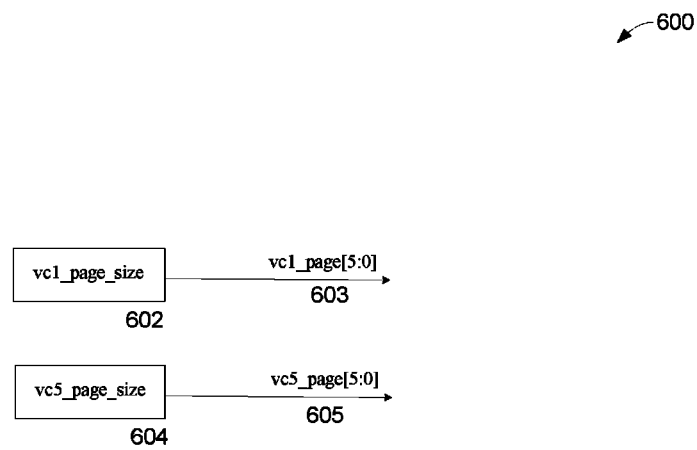
FIG. 6 illustrates one embodiment of the invention showing Page Size Registers.

FIG. 6 illustrates, generally at 600, one embodiment of the invention showing a a VC1 Page Size Register (vc1_page_size) at 602, and a VC5 Page Size Register (vc5_page_size) at 604. At 603 is vc1_page[5:0]. At 605 is vc5_page[5:0].

Final Buffer Virtual Output Queues (fb_voq)

In one embodiment of the invention there are final buffer virtual output queues.

In one embodiment of the invention the Final Buffer Virtual Output Queues (fb_voq) have the following features:
  One VOQ set with 10 VOQs for VC0 with different priority, VC1 & VC5 packet storing from Crosspoint Buffer to Final Buffer and forwarding out of Final Buffer to Egress Port.
  Each VOQ stores a memory page pointer for VC0 packet or memory buffer pointer for VC1/VC5 packets at SOP cycle while the packet is being written into Final Buffer.
  Based on the selected memory page/buffer pointer, write address will be generated and incremented accordingly to write the packet data into the Final Buffer.
  The stored memory page/buffer pointer will be used to generate Final Buffer read address while the VOQ is being selected to read out the packet.

In one embodiment of the invention, one Set of Virtual Output Queues (VOQ) for each Final Buffer will be needed. Each VOQ set has 10 VOQ to represent 4 different priorities of VC0 with CRitical Flow (CRF) bit set or reset (total 8) along with VC1 and VC5. Each VOQ stores the pointer of the Final Buffer Memory Block. While the packet is being written into the Final Buffer Memory, the Memory Block Pointer will also be stored into the proper VOQ entry based on incoming packet's VC and Priority level. When the stored packet is ready to be transmitted, the stored Memory Block Pointer will be retrieved from the specific VOQ entry, which will be used to select the Final Buffer Memory Block to read out the packet for transmission. Note that a CRF of 0 is lower, whereas CRF=1 is higher.

Figure 7:
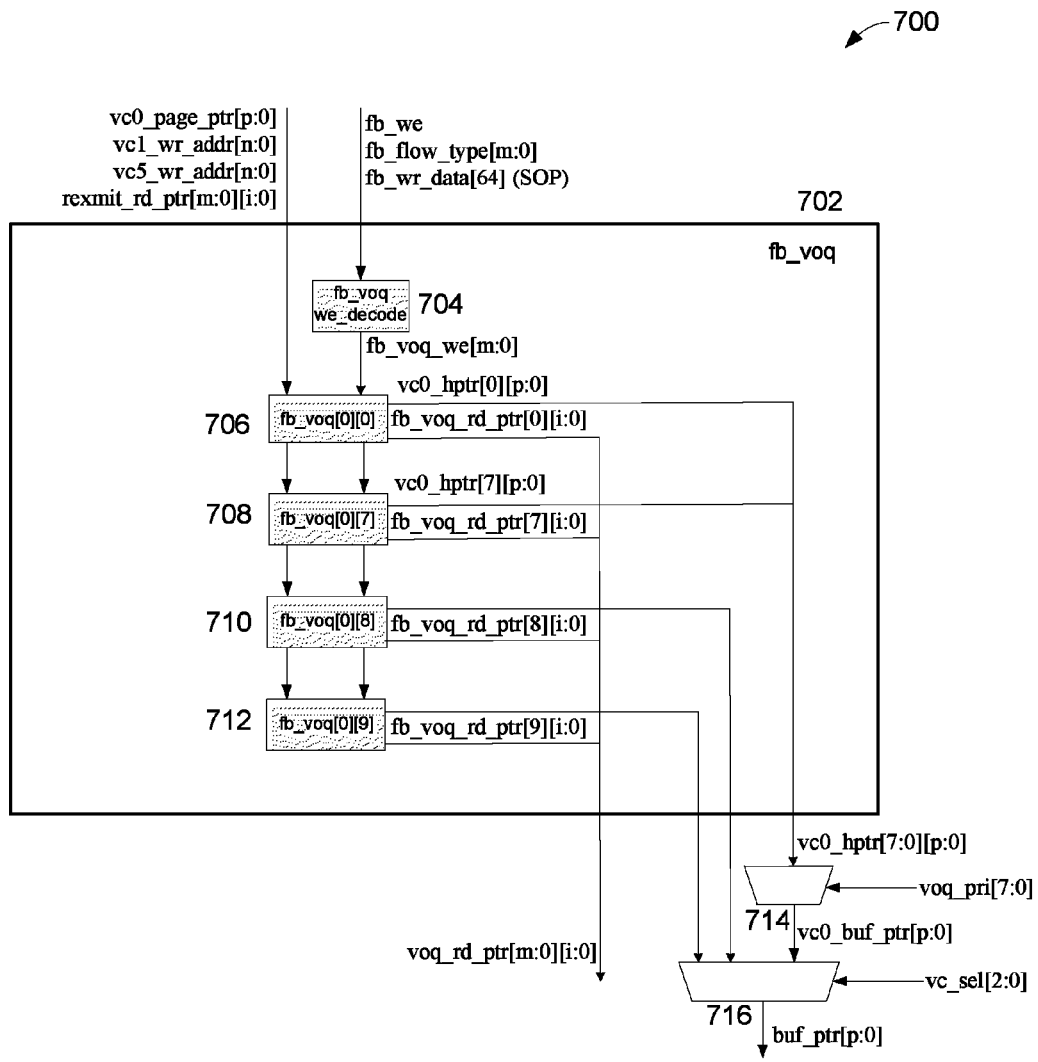
FIG. 7 illustrates one embodiment of the invention showing final buffer virtual output queues.

FIG. 7 illustrates, generally at 700, one embodiment of the invention showing final buffer virtual output queues. At 702 is fb_voq. At 704 is final buffer virtual output queue write enable decode (fb_voq we_decode). At 706 through 708 are virtual queues, representing, for example VC0. At 710 is a virtual queue, representing, for example VC1. At 712 is a virtual queue, representing, for example VC5. At 714 and 716 are selection logic.

In one embodiment of the invention, for example, as illustrated in FIG. 7, for (m=0; m<=9; m=m+1); fb_voq_we[m]=fb_we & fb_flow_type[m] & fb_wr_data[64] (SOP cycle).

In one embodiment of the invention, for example, as illustrated in FIG. 7, i=6 to support up to 65 VOQ entries In one embodiment of the invention, for example, as illustrated in FIG. 7, n=5 to support up to 64 Packet Index.

In one embodiment of the invention, for example, as illustrated in FIG. 7, m=9 to support 10 flows (8 for VC0 with 4 different priority levels with CRF set/reset. 1 each for VC1 & VC5)

In one embodiment of the invention, for example, as illustrated in FIG. 7, p=5 to support up to 34 memory pages.

In one embodiment of the invention, for example, as illustrated in FIG. 7, fb_voq_we[7:0] will be used to write VC0 packet's memory page pointer (vc0_page_ptr[p:0]) to the respective VC0 VOQ being selected through fb_flow_type[7:0] (corresponding to each priority level) at SOP cycle.

In one embodiment of the invention, for example, as illustrated in FIG. 7, fb_voq_we[9:8] will be used to write VC5/VC1 packet's memory write address (vc5_wr_addr[n:0] & vc1_wr_addr[n:0]) to the respective VC5/VC1 VOQ being selected through fb_flow_type[9:8] at SOP cycle.

In one embodiment of the invention, for example, as illustrated in FIG. 7, vc0_hptr[7:0][p:0] are the head of line memory page pointer for each priority level of VC0, which can be used to select the specific memory page (buf_ptr[p:0]) to transmitted the highest priority (selected through voq_pri[7:0]) VC0 packet out of the Final Buffer. This information will also be stored into Packet Retransmission Mapper which can be retrieved for buffer release if packet retransmission is not necessary.

In one embodiment of the invention, for example, as illustrated in FIG. 7, voq_rd_ptr[9:0][i:0] will be stored into Packet Retransmission Mapper which can be retrieved to realign VOQ entry if packet retransmission is necessary.

In one embodiment of the invention, for example, as illustrated in FIG. 7, rexmit_rd_ptr[m:0][i:0] retrieved from Packet Retransmission Mapper which will be reloaded into the specific voq_rd_ptr[i:0] if packet retransmission is necessary.

Final Buffer Write Address Generation (fb_wr_addr)

In one embodiment of the invention, there is a Final Buffer Write Address Generation (fb_wr_addr).

In one embodiment of the invention, while a VC0 packet is being received into the Final Buffer, Free memory page pointer from the top entry of the Free Buffer List will be retrieved. It will then be loaded into the respective VOQ according to packet's priority level. This memory page pointer will be used to generate memory write address to store the packet in the Final Buffer.

In one embodiment of the invention, while a VC1/VC5 packet is being received into the Final Buffer, Each Packet Buffer will be constructed as a Pointer FIFO through the allocated pages with a set of Start Address and Stop Address. The FIFO pointer for packet SOP will be loaded into the respective VOQ for VC1/VC5. This pointer will be used as memory write address and being incremented by 1 each time a packet data is being written into Final Buffer. After Stop Address is reached, it will rollback to Start Address and packet data reception will continue as long as FIFO is not full.

Figure 8:
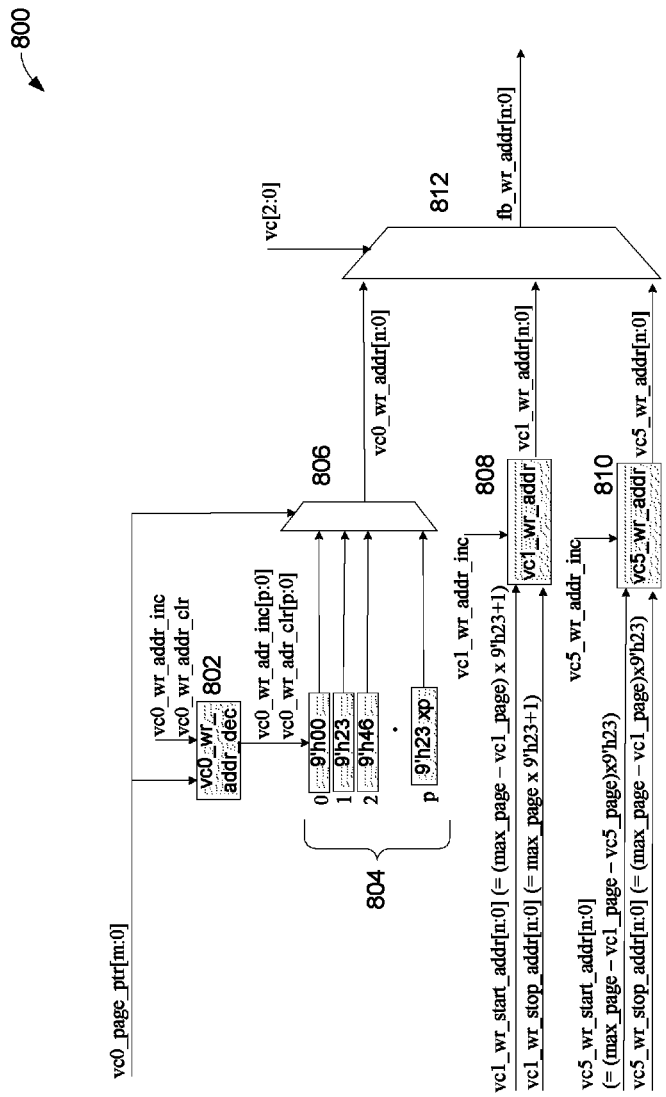
FIG. 8 illustrates one embodiment of the invention showing final buffer write address generation.

FIG. 8 illustrates, generally at 800, one embodiment of the invention showing final buffer write address generation.

In one embodiment of the invention, for example, as illustrated in FIG. 8,
vc[0]=!(fb_flow_type[7:0]) (for VC0 packet indication)
vc[1]=fb_flow_type[8] (for VC1 packet indication)
vc[2]=fb_flow_type[9] (for VC5 packet indication)
vc0_wr_addr_inc=fb_we & ~fb_wr_eop & vc[0] (asserted for each data cycle except EOP to increment VC0 write address)
vc0_wr_addr_clr=fb_we & fb_wr_eop & vc[0] (asserted at EOP to clear VC0 write address)
vc1_wr_addr_inc=fb_we & vc[1] (asserted for each data cycle to increment VC1 write address)
vc5_wr_addr_inc=fb_we & vc[2] (asserted for each data cycle to increment VC5 write address)

In one embodiment of the invention, for example, as illustrated in FIG. 8,

In one embodiment of the invention, for example, as illustrated in FIG. 8, m=5, 2^(m+1) specifies the range to accommodate the maximum memory pages per Final Buffer.

In one embodiment of the invention, for example, as illustrated in FIG. 8, n=10 specifies the memory address range for Final Buffer.

In one embodiment of the invention, for example, as illustrated in FIG. 8, VC0 will use memory page pointer to select Input Buffer Write Address for each memory page. The selected starting write address will be incremented by one each time a packet data is being written into Final Buffer and at EOP cycle, the address will be cleared to its starting address.

In one embodiment of the invention, for example, as illustrated in FIG. 8, VC1 & VC5 will use pointer based scheme. Programmable pages will be assigned to each VC (if enabled) and its Start Address and Stop Address will be derived based on the range of the assigned pages.

In one embodiment of the invention, for example, as illustrated in FIG. 8, each VC1 and VC5 buffer will be implemented as FIFO. Their write address will be initialized to start address after reset. Each time a VC1/VC5 packet data is being written into Final Buffer, the write address will be incremented by 1 until STOP address is reached, it will rollback to Start Address.

In one embodiment of the invention, for example, as illustrated in FIG. 8, the Final Buffer Write Address will be muxed (multiplexed) from each VC's Write Address when the VC is being selected for packet write operation.

In one embodiment of the invention, for example, as illustrated in FIG. 8, VC0's VOQ will be stored with the corresponding VC's memory page pointer and VC1/VC5's VOQ will be stored with the corresponding VC's Write Address.

In one embodiment of the invention, for example, as illustrated in FIG. 8, VC1/VC5 Start Address and Stop address can be calculated through the maximum pages vs. the number of allocated pages for VC1 & VC5 (see, for example, the formula above).

In FIG. 8 at 802 is VC0 write address decoder (vc0_wr_addr_dec). At 804 are a series of pointers. The 9' denotes 9 bits. h denotes hex (hexadecimal) notation. So, for example, 9'h23 denotes 9 bits that represent 35 decimal (i.e. h23). At 806 and 812 are selection logic. At 808 is vc1_wr_addr. At 810 is vc5_wr_addr.

Final Buffer Free Buffer Pointer List (fb_free_list)

In one embodiment of the invention there is a Final Buffer Free Buffer Pointer List (fb_free_list).

In one embodiment of the invention the Final Buffer Free Buffer Pointer List (fb_free_list) has the following features:
 After reset, all 34 memory pages are free with their memory page pointers being stored into Free Buffer List (if VC1/VC5 is enabled with 4 pages each being allocated to VC1 & VCS; only 26 pages will be stored).

Each time a packet is being received, the top entry of the Free Buffer List will be used as Final Buffer memory pointer to store the received packet.

After the stored packet is being transferred out of the Final Buffer, the used memory page pointer can be freed up from the stored VOQ entry back to Free Buffer List if ACK is returned from its Link Partner Dynamic buffer allocation is supported for VC0 packets with different priority level. While lower priority is blocked, higher priority can still go through as separate VOQ is used with free buffer available in Free Buffer List.

In one embodiment of the invention the Free Buffer List will be used to store free memory pages for VC0 packets. The maximum number of Free Pointers will be equal to total number of Memory Pages to be used in the Final Buffer. After reset, all the entries will be initialized to the starting pointer of each Memory Pages (35 64-bit dwords) in ascending order. After each packet is being received from Crosspoint Buffer, the top entry of the Free Buffer List will be popped, which will be used to store the packet to the memory Page being selected by this pointer.

In one embodiment of the invention after the stored packet has been moved out of the Final Buffer (being accessed through the retrieved VOQ entry) to Egress Port, ACK returned from Link Partner will cause the used memory page to be freed up with its pointer moving back to Free Buffer List.

Figure 9:
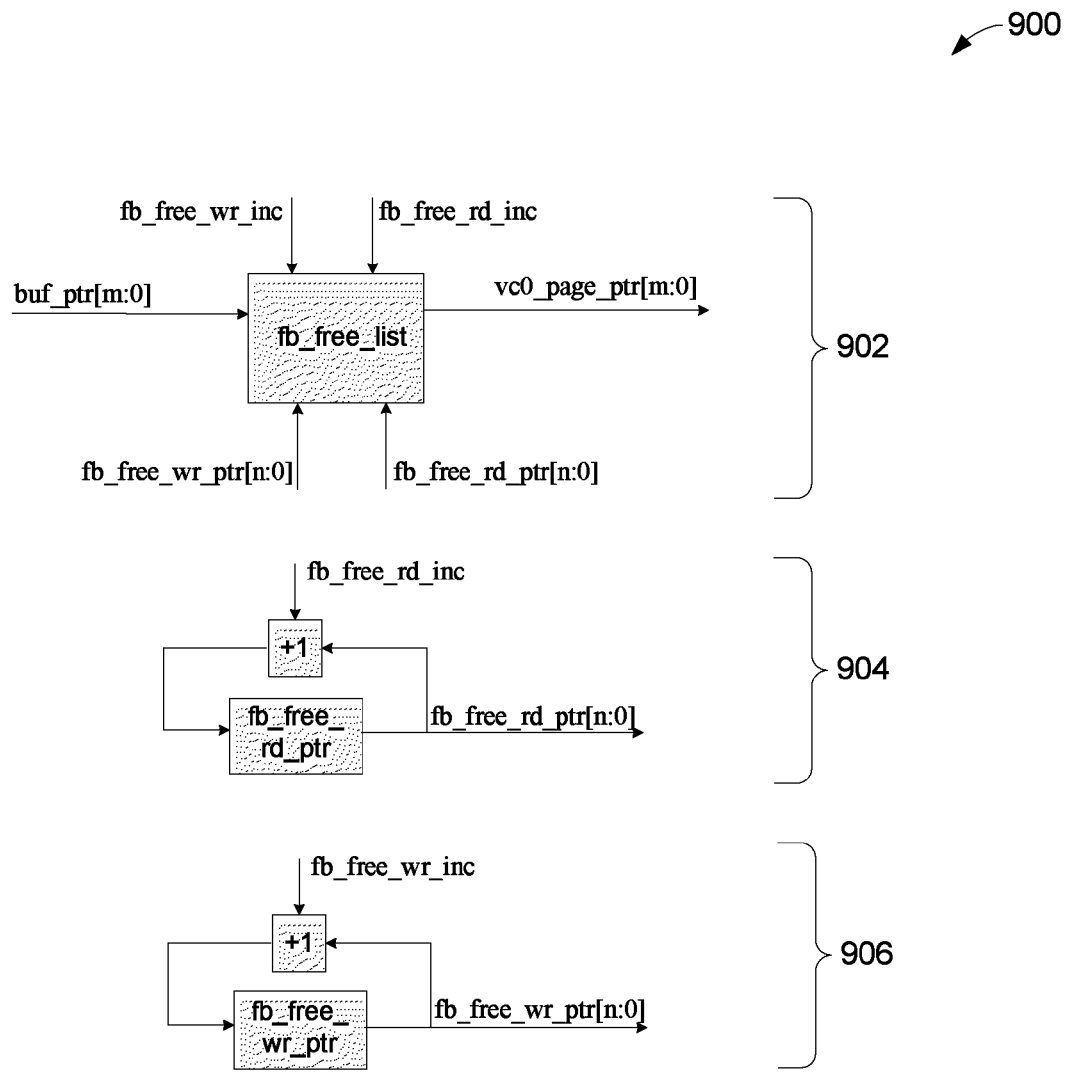
FIG. 9 illustrates one embodiment of the invention showing Final Buffer Free Buffer Pointer List.

FIG. 9 illustrates, generally at 900, one embodiment of the invention showing Final Buffer Free Buffer Pointer List (fb_free_list).

In one embodiment of the invention, for example, as illustrated in FIG. 9, after reset, fb_free_list[p:0] will be initialized to the following:
   0, 1, . . . p (if VC0 Enabled) where p=33 to accommodate total of 34 memory blocks
   0, 1, . . . p−vc1_page_size (if VC0 & VC1 enabled)
   0, 1, . . . p−vc5_page_size−vc1_page_size (if VC0, VC1 & VC5 enabled)

In one embodiment of the invention, for example, as illustrated in FIG. 9, fb_free_rd_inc is generated to pop up the next free memory page pointer each time a VC0 packet is being written into Final Buffer.

In one embodiment of the invention, for example, as illustrated in FIG. 9, fb_free_wr_inc is generated after releasing the used memory block pointer each time a VC0 packet is being transmitted out successfully.

In one embodiment of the invention, for example, as illustrated in FIG. 9, vc0_page_ptr[m:0] (where m=5) pointed to a free Final Buffer memory page to store the packet.

In one embodiment of the invention, for example, as illustrated in FIG. 9, buf_ptr[m:0] is released from the selected VOQ entry after the VC0 packet has been transmitted successfully with ACK returned from Link Partner.

In FIG. 9 at 902 is final buffer free list. At 904 is final buffer free read pointer. At 906 is final buffer free write pointer. Note that signals with the same name are considered connected. So, for example, fb_free_wr_ptr[n:0] output by 906 is an input to 902.

Final Buffer Read Address Generation (fb_rd_addr)

In one embodiment of the invention there is a Final Buffer Read Address Generation (fb_rd_addr).

In one embodiment of the invention when a VC0 packet is being transmitted out of the Final Buffer, the specific VOQ will be selected based on packet's priority level. The stored memory page pointer will be retrieved to generate memory read address to read out the packet from the Final Buffer.

In one embodiment of the invention when a VC1/VC5 packet is being transmitted out of the Final Buffer, the specific VOQ will be selected. The stored FIFO pointer will be retrieved to generate memory read address to read out the packet from the Final Buffer. Each time a packet data is being read out of the Final Buffer, read address will be incremented by 1, and after Stop Address is reached, it will be rollback to Start Address and packet transmission will continue as long as FIFO is not empty.

Figure 10:
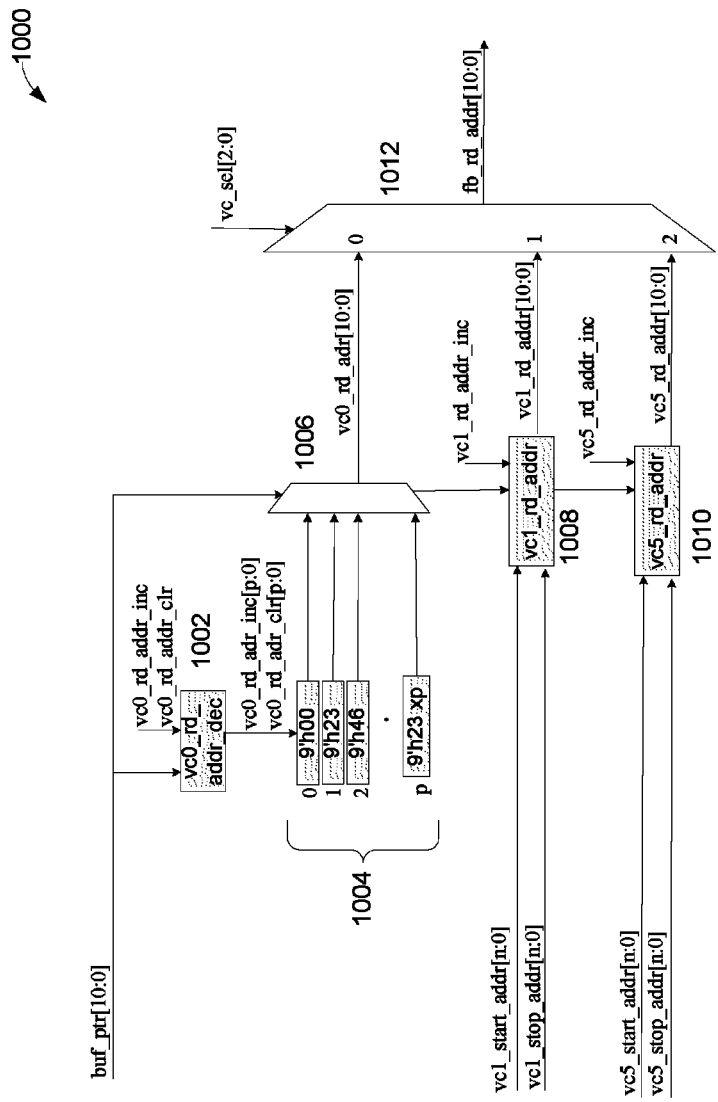
FIG. 10 illustrates one embodiment of the invention showing Final Buffer Read Address Generation.

FIG. 10 illustrates, generally at 900, one embodiment of the invention showing Final Buffer Free Buffer Pointer List (fb_free_list).

In one embodiment of the invention, for example, as illustrated in FIG. 10,
   vc1_start_addr=(max_page−vc1_page)×9'h23+1;
   vc1_stop_addr=max_page×9'h23+1;
   vc5_start_addr=(max_page−vc1_page−vc5_page)× 9'h23;
   vc5_stop_addr=(max_page−vc1_page)×9'h23;
   vc_sel[2:0] is used to select VC5 (vc_sel[2]=1), VC1 (vc_sel[1]=1) or VC0 (vc_sel[0]=1);
   vc0_rd_addr_inc=fb_re & ~fb_rd_eop & vc_sel[0]; (asserted for each data cycle except EOP to increment VC0 read address);
   vc0_rd_addr_clr=fb_re & fb_rd_eop & vc_sel[0]; (asserted at EOP to clear VC0 read address);
   vc1_rd_addr_inc=fb_re & vc_sel[1]; (asserted for each data cycle to increment VC1 read address);
   vc5_rd_addr_inc=fb_re & vc_sel[2]; (asserted for each data cycle to increment VC5 read address).

In one embodiment of the invention, for example, as illustrated in FIG. 10, buf_ptr[5:0] is VOQ's head-of-line pointer of VC0 for the corresponding Final Buffer (buf_ptr[10:0] is VOQ's head-of-line address of VC1/VC5). It will be used to generate the respective memory block's read address to read out the stored packet from Final Buffer.

In one embodiment of the invention, for example, as illustrated in FIG. 10, after the specific VC is being selected, its buf_ptr will be fetched the VOQ and the read address will be generated to read out the packet from Final Buffer.

In one embodiment of the invention, for example, as illustrated in FIG. 10, for VC0 packet, page based scheme will be used. The address being generated from the selected page will be incremented each time a packet data is being read out of the Final Buffer. After all the packet data have been read out, the address corresponding to a specific page pointer will be reset to its initial value.

In one embodiment of the invention, for example, as illustrated in FIG. 10, for VC1/VC5 packets, pointer based scheme will be used. Programmable pages will be assigned to each VC (if enabled) and its Start Address and Stop Address will be derived based on the range of the assigned pages (see, for example, formula above).

In one embodiment of the invention, for example, as illustrated in FIG. 10, each time a VC1/VC5 packet data is being read out of Final Buffer, the read address will be incremented by 1 until STOP address is reached, it will rollback to Start Address. After all the packet data have been read out, the address will not be reset to its initial value as VC1/VC5 packet buffer is constructed as FIFO.

In one embodiment of the invention, for example, as illustrated in FIG. 10, the Final Buffer Read Address will be muxed from each VC's Read Address when the VC is being selected for packet read operation.

In FIG. 10 at 1002 is VC0 read address decoder (vc0_rd_addr_dec). At 1004 are a series of pointers. The 9' denotes 9 bits. h denotes hex (hexadecimal) notation. So, for example, 9'h23 denotes 9 bits that represent 35 decimal (i.e. h23). At 1006 and 1012 are selection logic. At 1008 is vc1_rd_addr. At 1010 is vc5_rd_addr.

Packet Retransmission Mapper (rexmit_mapper)

In one embodiment of the invention there is a Packet Retransmission Mapper (rexmit_mapper).

In one embodiment of the invention while the packet is being transmitted, Packet Retransmission Mapper will be used to store packet transfer mode (RT/CT), memory page pointer (for VC0 packets), VOQ Index (VC type and priority) and VOQ Read Pointer (pointed packet's buffer pointer for the transmitted packet). The stored information will be retrieved while ACK/NACK is returned from Link Partner. It will be used to free up buffer space if packet transfer is completely successfully or realign VOQ Read Pointer in case packet retransmission is necessary.

Figure 11:
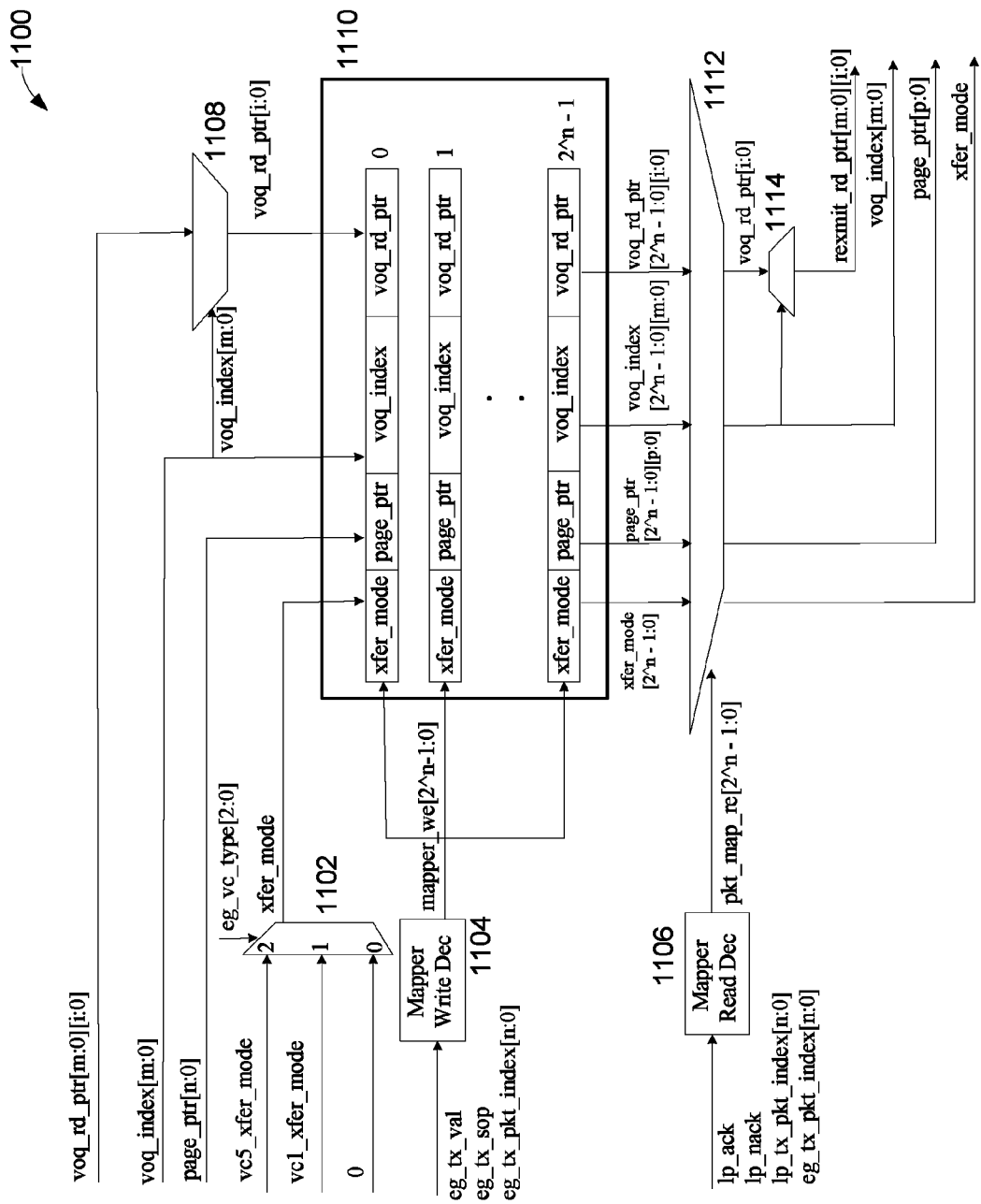
FIG. 11 illustrates one embodiment of the invention showing a Packet Retransmission Mapper.

In one embodiment of the invention, for example, as illustrated in FIG. 11, i=6 to support up to 65 VOQ entries for VC1/VC5 (VC0 only needs to support 35 VOQ entries).

In one embodiment of the invention, for example, as illustrated in FIG. 11, n=5 to support up to 64 Packet Index.

In one embodiment of the invention, for example, as illustrated in FIG. 11, m=9 to support 10 flows (8 for VC0 with 4 different priority levels with CRF set/reset. 1 each for VC1 & VC5).

In one embodiment of the invention, for example, as illustrated in FIG. 11, VC0 will always be in RT mode. VC1 & VC5 can either be RT mode or CT mode based on vc1_xfer_mode and vc5_xfer_mode setting. For CT mode packet during retransmission request, it will not be retransmitted and its dword count will be released to decrement Dword Counter which will be used for free buffer space calculation.

In one embodiment of the invention, for example, as illustrated in FIG. 11, while the packet is being transmitted out, its RT/CT transfer mode (xfer_mode), memory page pointer (page_ptr[P:0]) for VC0 packet, VOQ read pointer (voq_rd_ptr[i:0]) and VOQ index (voq_index[m:0]) for VC5, VC1 & VC0 with 8 different priority will be written into Retransmit Mapper being selected through transmitted packet index (eg_tx_pkt_index[n)]) at Start of Packet cycle (eg_tx_sop) while valid indication (eg_tx_val) is asserted.

In one embodiment of the invention, for example, as illustrated in FIG. 11, the stored information will be retrieved being selected through the returned packet index (Ip_tx_pkt_index[n:0]) after either ACK (Ip_ack) or NACK (Ip_nack) is generated from Link partner. This information will be used to release memory page pointer for VC0 packets or release dword count for VC1/VC5 packets if packet retransmission is not necessary, or realign VOQ read pointer if packet retransmission is needed between Ip_tx_pkt_index [n:0] and eg_tx_pkt_index[n:0]) for all the outstanding packets.

In FIG. 11 at 1102, 1108, 1112, and 1114 are selection logic. At 1104 is Mapper Write Decoder (Mapper Write Dec). At 1106 is Mapper Read Decoder (Mapper Read Dec). At 1110 is storage for a variety of information (e.g. xfer_mode (i.e. RT or CT), page_ptr, voq_index, voq_rd_ptr).

At 1102 input 0 is forced to 0, thus VC0 is forced into RT mode (0=RT mode) in this embodiment.

Dword Count Mapper (dw_cnt_mapper)

In one embodiment of the invention there is a Dword Count Mapper (dw_cnt_mapper).

In one embodiment of the invention Dword Count Mapper is used to store VC1/VC5 packet's dword count while the packet is being transmitted out. The stored information will be retrieved when ACK/NACK is returned from Link Partner. While in RT or CT mode with ACK returned, it indicates the packet has been transmitted successfully; or in CT mode with NACK returned, it indicates packet has not been transmitted successfully but retransmission will not be necessary. As a result, the used buffer space can be freed up by decrementing Dword Counter with the retrieved dword count.

Figure 12:
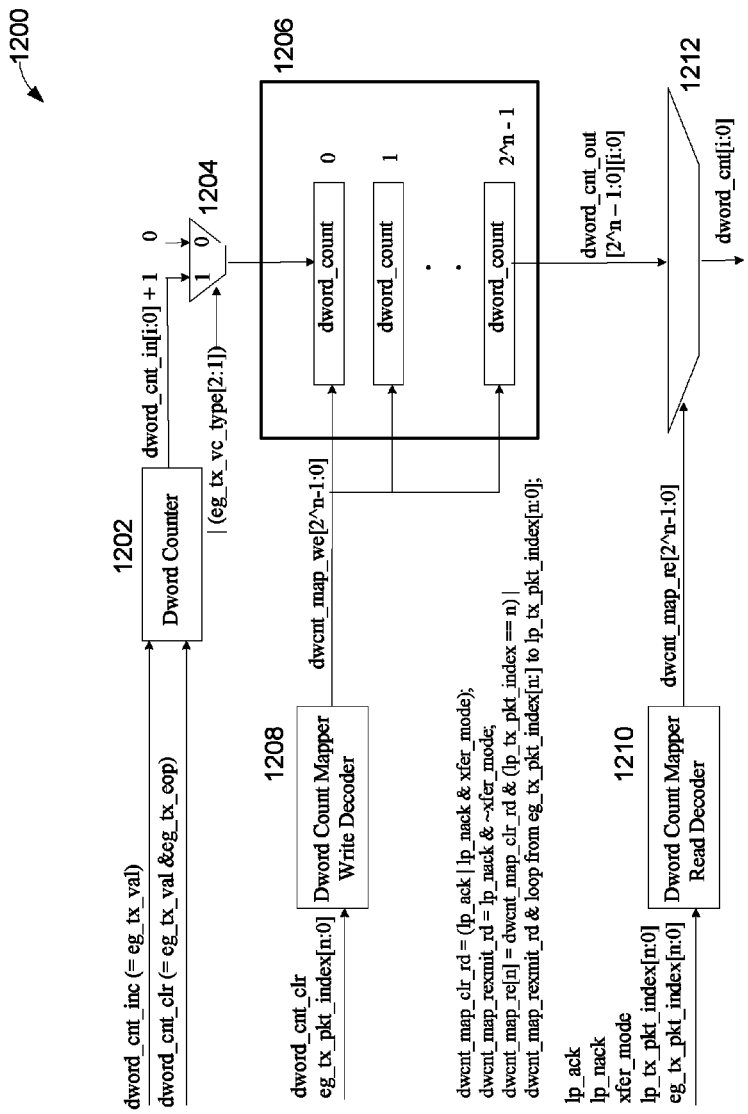
FIG. 12 illustrates one embodiment of the invention showing a Dword Count Mapper.

In one embodiment of the invention, for example, as illustrated in FIG. 12, i=5 to support up to 35 dword maximum size packet.

In one embodiment of the invention, for example, as illustrated in FIG. 12, n=5 to support up to 64 entries of dword count mapper.

In one embodiment of the invention, for example, as illustrated in FIG. 12, each time a packet's dword is being sent out, dword_cnt_inc will be asserted through Egress Transmit Valid (eg_tx_val) signal to increment Dword Counter until dword_cnt_clr is asserted at the end of the packet through "Egress Transmit Valid signal and with Egress Transmit End of Packet signal (eg_tx_val & eg_tx_eop)" to clear dword counter.

In one embodiment of the invention, for example, as illustrated in FIG. 12, when dword_cnt_clr is asserted, the corresponding entry of Dword Count Mapper being indexed through transmitted packet index (eg_tx_pkt_index[n:0]) will be updated with the dword count of the VC1 packet (eg_tx_vc_type[1]=1) or the VC5 packet (eg_tx_vc_type[2]=1).

In one embodiment of the invention, for example, as illustrated in FIG. 12, the stored information being selected through the returned packet index (Ip_tx_pkt_index[n:0]) will be used to decrement VC1/VC5 dword counter (to free Buffer space) when ACK (Ip_ack) is returned for a RT/CT mode packet or NACK (Ip_nack) is returned for all the outstanding CT mode (xfer_mode=1) packets (between Ip_tx_pkt_index[n:0] and eg_tx_pkt_index[n:0]).

In FIG. 12 at 1202, and 1212 are selection logic. At 1202 is Dword Counter. At 1208 is Dword Count Mapper Write Decoder. At 1210 is Dword Count Mapper Read Decoder. At 1206 is storage for dword_count.

Thus a method and apparatus for unified final buffer with pointer-based and page-based scheme for traffic optimization have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
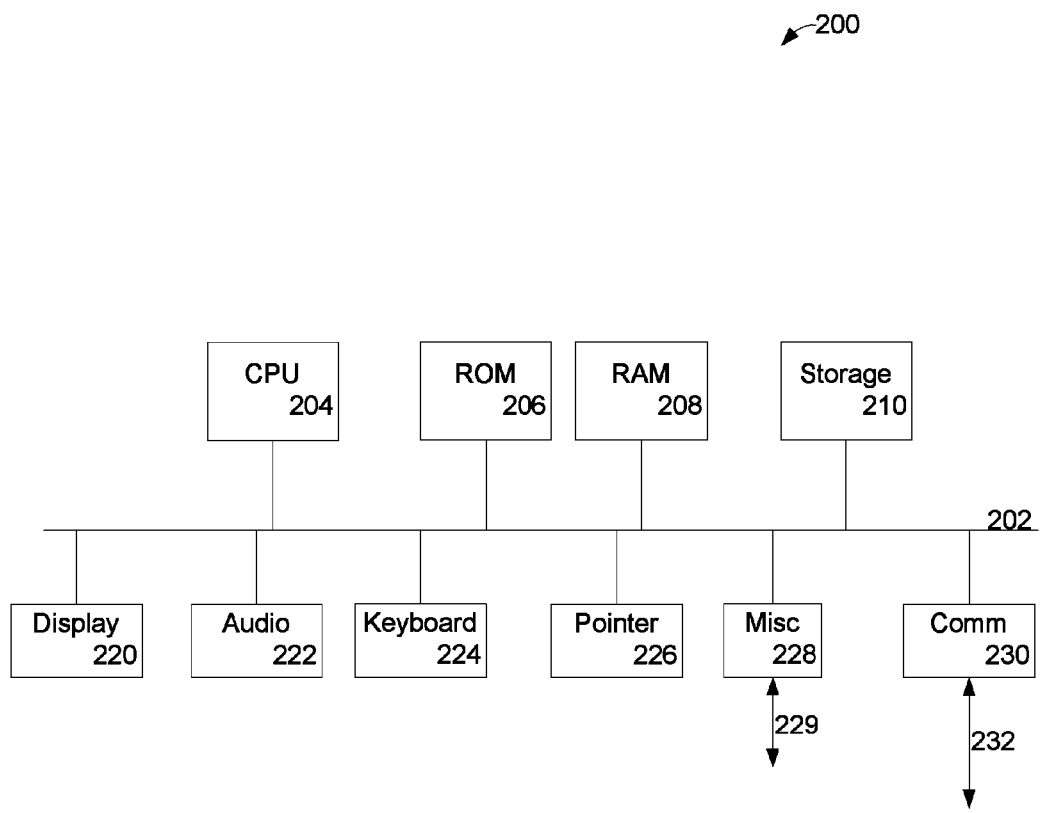
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Various spellings may be used for terms used in the description. These variations are to be understood to relate to the same term unless denoted otherwise. For example: fail-safe is also spelled fail safe, and failsafe; start-up is also spelled startup, and start up; subthreshold is also spelled sub-threshold, and sub threshold; etc.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as ""substantially equal" is used to indicate that they are for all practical purposes equal.

It is to be understood that in any one or more embodiments of the invention where alternative approaches or techniques are discussed that any and all such combinations as my be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for unified final buffer with pointer-based and page-based scheme for traffic optimization have been described.

What is claimed is:

1. A method comprising:
configuring a same memory for operation at a same time as both a page based scheme and a pointer based scheme for one or more egress final buffers, and wherein said page based scheme uses a memory's page pointer to store a VC0 packet based on said VC0 packet's priority level, such that arrived lower priority packets do not block later arrived higher priority packets, and wherein the pointer based scheme stores a VC1/VC5 packet, and wherein all available memory page pointers are stored in a free buffer list;
transmitting a packet from said one or more egress final buffers, wherein said transmitted packet has associated with it an index denoted transmitted packet index;
using said transmitted packet index to store in a Packet Retransmission Mapper a Transfer Mode associated with said transmitted packet, a Memory Page Pointer, a VOQ Index, and a VOQ Read Pointer, wherein said Transfer Mode is selected from the group consisting of RT, and CT; and
using said transmitted packet index to store in a Dword Count Mapper a count of dwords transmitted for one or more VC1/VC5 packets.

2. A method comprising:
configuring a same memory for operation at a same time as both a page based scheme and a pointer based scheme for one or more egress final buffers, and wherein said page based scheme uses a memory's page pointer to store a VC0 packet based on said VC0 packet's priority level, such that arrived lower priority packets do not block later arrived higher priority packets, and wherein the pointer based scheme stores a VC1/VC5 packet, and wherein all available memory page pointers are stored in a free buffer list;
transmitting a packet from said one or more egress final buffers, wherein said transmitted packet has associated with it an index denoted transmitted packet index;
using said transmitted packet index to store in a Packet Retransmission Mapper a Transfer Mode associated with said transmitted packet, a Memory Page Pointer, a VOQ Index, and a VOQ Read Pointer, wherein said Transfer Mode is selected from the group consisting of RT, and CT;
receiving from a Link Partner an ACK and a returned packet index;
using said returned packet index to look up in said Packet Retransmission Mapper a Memory Page Pointer associated with said returned packet index; and
releasing memory pointed to by said Memory Page Pointer associated with said returned packet index.

3. The method of claim 2 wherein said released memory is only for VC0 packets.

4. The method of claim 1 further comprising:
receiving from a Link Partner an ACK and a returned packet index;
using said returned packet index to retrieve from said Dword Count Mapper a stored dword count associated with said returned packet index; and
releasing memory associated with said stored dword count associated with said returned packet index.

5. The method of claim 4 wherein said released memory is only for VC1/VC5 packets.

6. A method comprising:
configuring a same memory for operation at a same time as both a page based scheme and a pointer based scheme for one or more egress final buffers, and wherein said page based scheme uses a memory's page pointer to store a VC0 packet based on said VC0 packet's priority level, such that arrived lower priority packets do not block later arrived higher priority packets, and wherein the pointer based scheme stores a VC1/VC5 packet, and wherein all available memory page pointers are stored in a free buffer list;

transmitting a packet from said one or more egress final buffers, wherein said transmitted packet has associated with it an index denoted transmitted packet index;

using said transmitted packet index to store in a Packet Retransmission Mapper a Transfer Mode associated with said transmitted packet, a Memory Page Pointer, a VOQ Index, and a VOQ Read Pointer, wherein said Transfer Mode is selected from the group consisting of RT, and CT;

receiving from a Link Partner a NACK and a returned packet index;

when said retransmission is for an RT Transfer Mode then:
using said returned packet index to look up and retrieve from said Packet Retransmission Mapper all packets' VOQ Index and VOQ Read Pointer from said returned packet index up to and including a transmitted packet index; and
realigning a VOQ entry used to store a packet pointer for retransmitting all packets associated with said returned packet index up to and including said transmitted packet index;

when said retransmission is for a CT Transfer Mode then:
using said returned packet index to look up and retrieve from said Dword Count Mapper all packets' dword count from said returned packet index up to and including a transmitted packet index; and
releasing memory associated with said stored dword count associated with said returned packet index up to and including said transmitted packet index.

* * * * *